Patented June 16, 1936

2,044,194

UNITED STATES PATENT OFFICE 2,044,194

PROCESS OF PREPARING DRY POWDER FROM EMULSIONS AND SOLUTIONS

Johan Marie Visser, Nijmegen, Netherlands

No Drawing. Application November 25, 1932, Serial No. 644,401. In the Netherlands November 27, 1931

7 Claims. (Cl. 99—203)

In many cases it is necessary when drying emulsions and solutions to powder to keep the temperature at which the drying takes place as low as possible in order to prevent the chemical constituents of the substance from being attacked and thus the quality of the dry substance lessened. This does not apply of course to all those cases whereby the dissolved substance is insensitive to more or less high temperatures. In preparing dry substances from solutions and emulsions, which are of organic origin, the temperature plays a very great part and this invention has for its object to render it possible to prepare dry substances out of such solutions and emulsions without the chemical composition of the matter to be dried, being altered.

In regard to milk, till now, no process is known, whereby a chemically unchanged milk-powder is obtained. In judging this it is insufficient to pay attention only to the solubility of the obtained powder, as there exist also conversion products of the milk which are also soluble. It has also appeared that the milk fat is altered chemically by oxidation, whereby the powder in the long run obtains an unfavourable odor and taste. Furthermore the vitamin-A is destroyed by oxidation.

With the known process of Hatmaker which is worked with relatively high temperature and without rarefaction of the air a milk powder is obtained, which is already partly converted, in which the fat bulbs present are not emulgated when dissolving the powder.

In the process of Krause a very great quantity of air must be heated and this, in view of the bad heat-transmissions of air is always very costly whereas the fat is converted by oxidation by the great quantity of oxygen which is present in the air, so that the powder obtains after a short time an unfavourable odor and taste.

The process according to this invention consists in taking the liquid or emulsion which must be dried and bringing it in finely divided condition into an air-rarefied space in contact with a heated, finely powdered solid matter which at the beginning of the process is already present on the bottom of the spraying space and which binds the fluid particles by absorption or adsorption and by means of its great surface promotes the quick evaporation of the liquid particles, whereas the vapor which forms is continually sucked off.

In contrast with the sprayers of Krause, at the beginning of this process powdery material is present on the bottom of the spraying space.

By spraying the liquid or emulsion which must be dried on a finely powdered solid substance which is stirred and heated a formation of powder can be obtained by the quick evaporation, whereby the danger of decomposition of the substance which is evaporated to powder is very trifling. According to the invention it is also possible to take a finely powdered solid substance, which is heated and stirred and on which the liquid or emulsion, which is to be dried, is sprayed, a powder which has been obtained before from the liquid or emulsion and thus to obtain immediately a powder as final product which is not mixed with the strange substance. By working in an air-rarefied space in which the evaporation of the liquid occurs, the temperature is lowered, whereby the risk of decomposition is further diminished. By altering the vacuum it is possible to let the evaporation take place at such a temperature as is necessary to prevent any decomposition of the dry substance.

The spraying of milk in an air-rarefied space is in itself known, see British Patent 112,965. With the method according to this specification no high vacuum is, however, obtainable whereas in the air-rarefied space no powder is brought.

Also it is proposed in the British Patent 155,927 to dry milk and such like substances as quickly and as intensively as possible by making the liquid surface as large as possible avoiding the use of a stream of drying gas.

In the Dutch Patent 12,839 a process is described whereby liquids act upon solid substances spread out in powder form in the upper part of a tower which action takes place in the form of a spraying haze and which is supplied to the upper part of the tower by means of a stream of air from beneath to above through the tower the fall of the particles being delayed as much as possible. In this process the liquid is exposed as long as possible to a stream of air in order to lengthen the period of reaction. Therefore in those cases where the liquid which must be treated contains substances, the chemical composition of which alters easily under the action of the air, this process cannot therefore be applied in case the aim is to dry such a liquid without alteration of the chemical constituents. Another important difference with the process according to the invention consists herein that there is a heated finely powdered solid substance present in the beginning.

Two processes are also known (see C-Knoch "Handbuch der neuzeitlichen Milchverwertung") for drying liquids which—it is true—work with vacuum but differ principally from the process according to the invention. These are the vacuum-spray-drying-drums manufactured by the Chemcal and Vacuum-Machinery Co. Inc., whereby the liquid in a space with more or less vacuum is sprayed against a heated rotating cylinder and the obtained mass is continually scraped off and the "Exsikkator" of Ekenberg, whereby a heated drum rotating in a space kept under more or less vacuum is dipped in the liquid which is to be dried and the mass after drying is also scraped off.

The great principal difference with the process according to the invention consists herein that it is expedient for a quick evaporation besides the spraying use is made of a finely divided heated dry substance which is present in the apparatus beforehand.

The use of the process according to the invention for making milkpowder from fresh milk is of very great importance. The heating of the absorbing substance (either a strange substance or milkpowder originating from a previous charge) can take place in a known manner in a cask with double bottom through which warm water is led, whereas a stirrer provides for the desired division and by means of a vacuum device the desired degree of rarefaction of the air is obtained. This rarefaction of the air not only has the advantage that the evaporation temperature is lowered but has, by the application of the process on the manufacture of milkpowder, as second advantage that the powder comes into contact with a minimum of air so that the danger of oxidation is prevented to a high degree. With this process it is therefore possible to obtain pure milkpowder, in which the vitamin-A has remained untouched.

The used cask with double bottom can have a total content of 1m³ with an effective content of about half.

For an absorbing substance 25 kg. of very fine powdered sugar can be used which on account of the fine division has a very large surface. This powdered sugar is kept in violent movement by a stirrer.

In the double bottom warm water or steam circulates with such a speed and in such quantity and at such temperature that a good transmission of heat takes place.

In case the milk is pasteurized and in that case immediately after the pasteurization and therefore at a high temperature (60 to 70° C.) the milk is sprayed in finely divided condition into the cask where a vacuum of 700 mm. mercury column, is maintained which corresponds with a boiling temperature of water of 41 to 42° C.

As long as the milk still contains all the water a high temperature can be applied without producing the danger that the constituents are converted. However, as soon as the water is evaporated a low temperature must be provided for and this may not rise above the temperature corresponding with the rarefaction of the air. In order to obtain a final product with 30% added sugar, 48 kg. milkpowder must be present in the mixture and to this add about 400 l. fresh full milk to be atomized. The whole process by good transmission of heat takes place in about one hour.

For obtaining the sugar product 20 kg. powdered sugar must be brought in the spraying space.

After having obtained a certain mixture of sugar-milkpowder it is, however, also possible to use a part thereof for the next charge etc. till if desired the sugar percentage has come practically to zero.

In case the total obtained quantity must be a pure milk product without admixture of sugar or the like, a commercially obtainable milk powder can be used as solid substance.

The pure milk product finally obtained can always be used for a next charge.

It is evident that for the preparation of milkpowder according to the invention sterilized milk can be used as well as fresh and pasteurized milk.

In applying the process according to the invention a limited and cheap device will do as no high temperature and therefore no high pressure steam apparatus is required whereas for the vacuum use can be made of a connection with the local electrical network.

It is evident also that a combination of another solid substance with another liquid, solution or emulsion which is atomized can be prepared with the process of the invention.

The preparation of a cheap vitamin-product of cheap primordial substances (natural products) is contemplated, of which small quantities which are added to margarine give it a sufficient content of vitamins.

In case primordial substances are worked up which will certainly contain all the vitamins A, B, C and D, then the margarine provided with this vitamin product will be of greater value than summer butter as it will contain a greater quantity of vitamin C and most certainly it will have a higher content of all vitamins than winter butter.

Besides an addition to margarine of vitamin-product manufactured in the above way, this method can also be used for making very cheap tablets which also will certainly contain all vitamins A to D and indeed in such quantity that by consumption of one tablet each day children can be given all the vitamins they require in order to protect them from all illnesses caused by lack of vitamins especially in the season when fruit or fresh vegetables are not easily obtainable.

Sundry modifications are possible within the scope of the invention and more particularly for instance to use a suspension or an emulsion or a combination of both instead of a solution.

Having now described my invention, what I claim as new and desire to secure by Letters Patent is:—

1. A process of preparing dry powder from substances in solution which consists in first depositing a heated and finely divided solid substance on the bottom of an air-rarefied heated chamber, then spraying said solution in a finely divided state into said chamber over said solid substance under constant stirring and finally and continuously removing the arising vapors.

2. A process in accordance with claim 1 in which said heated and powdered solid substance consists of powder previously evaporated from such solution.

3. A process of drying substances in solution which are sensitive to oxygen and temperature changes, which process consists in depositing an absorbent solid substance on the bottom of a heated vacuum chamber, and spraying said solution into said chamber over said solid substance during constant stirring.

4. A process in accordance with claim 3 in which said absorbent substance consists of a powder corresponding to the substance obtained from a previous evaporation of such solution.

5. A process according to claim 3 in which the heating temperature of said vacuum chamber, after the greater amount of solution has been dispelled, is regulated approximately to the temperature which corresponds to the evaporating temperature of the solution.

6. A process of preparing milk powder from fresh milk, which consists in first depositing fine powdered sugar on the bottom of an air-rarefied heated chamber, then spraying the fresh milk in a finely divided state into said chamber over said sugar deposit under constant stirring and continuously removing the arising vapors.

7. A process according to claim 6, in which the proportion of the ingredients is from 5 to 12 kg. of sugar to 100 liters fresh milk.

JOHAN MARIE VISSER.